United States Patent Office 3,546,204
Patented Dec. 8, 1970

3,546,204
PHENYL-AZO-PHENYL DYES COMPOUNDS
Max A. Weaver and David J. Wallace, Kingsport, Tenn., assignors to Eastman Kodak Company, Rochester, N.Y., a corporation of New Jersey
No Drawing. Continuation-in-part of application Ser. No. 567,081, July 22, 1966. This application Oct. 23, 1968, Ser. No. 770,108
Int. Cl. C07c 107/06; C09b 29/06, 29/24
U.S. Cl. 260—205
11 Claims

ABSTRACT OF THE DISCLOSURE

Water-insoluble monoazo compounds having a benzene diazo component and an aniline coupling component in which the aniline nitrogen atom is substituted with an alkyl- cycloalkyl-, or aryl, sulfonamidoalkyl group whose nitrogen atom is substituted with an organic radical. The monoazo compounds are particularly useful for dyeing polyester textile materials.

---

This application is a continuation-in-part of our copending application Ser. No. 567,081, now abandoned which was filed July 22, 1966 for "Azo Dyes for Hydrophobic Fibers."

This invention relates to certain novel, water-insoluble monoazo compounds and, more particularly, to monoazo compounds useful as dyes for polyester textile materials and to polyester textile materials dyed with the novel compounds.

The novel azo compounds of the invention have the formula (I)
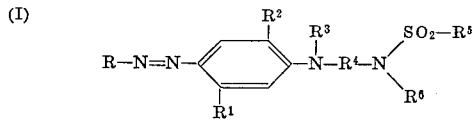

wherein:
R is a phenyl radical;
R¹ is hydrogen, lower alkyl, halogen, or a group having the formula —NHA in which A is an acyl group;
R² is hydrogen, lower alkyl, or lower alkoxy;
R³ is hydrogen, a lower alkyl radical, cyclohexyl, an aralkyl radical or an aryl radical;
R⁴ is a lower alkylene radical;
R⁵ is a lower alkyl radical, cyclohexyl, an aryl radical or an amino group; and
R⁶ is substituted lower alkyl, cyclohexyl, an aralkyl radical, an aryl radical, a thiazolyl radical, a benzothiazolyl radical, a thiadiazolyl radical, a triazolyl radical, a benzimidazolyl radical, a pyridyl radical, a quinolyl radical, or, when R¹ is —NHA, lower alkyl.

The novel compounds of the invention give yellow to blue dyeings when applied according to conventional dyeing procedures to polyester textile materials such as fibers, yarns, and fabrics. The novel azo compounds exhibit improved fastness properties, such as fastness to light and resistance to sublimation, on polyesters. The superior sublimation fastness possessed by the compounds of the invention renders them particularly useful in the thermal fixation technique of dyeing polyester materials. Describing the novel azo compounds as water-insoluble means that they are substantially water-insoluble and accordingly free from water-solubilizing groups such as carboxyl and sulfo groups.

The phenyl radical represented by R can be unsubstituted or, preferably substituted, with, for example, lower alkyl, lower alkoxy, aryl, nitro, halogen, lower alkylthio, cyclohexylthio, arylthio, lower aralkylthio, formyl, lower alkanoyl, lower alkoxycarbonyl, aroyl, lower alkanoylamino, aroylamino, dicarboximido, cyano, lower alkylsulfonyl, arylsulfonyl, lower alkylsulfonamido, trifluoromethyl, sulfamoyl, lower alkylsulfamoyl, carbamoyl, lower alkylcarbamoyl, thiocyanato, etc. The alkanoyl groups can be substituted with substituents such as halogen, phenyl, cyano, lower alkoxy, lower alkylthio, lower alkylsulfonyl, etc. The alkylsulfonyl groups can also be substituted, for example, with cyano, hydroxy, halogen and the like. The alkoxycarbonyl groups can be substituted, for example, with hydroxy or cyano. As used herein to describe a group containing an alkyl moiety, "lower" designates a carbon content from 1 to about 4 carbon atoms.

Examples of the alkyl and alkoxy groups which can be present on the diazo components include methyl, ethyl, isopropyl, propyl, butyl, ethoxy, propoxy, butoxy, etc. Chlorine and bromine are typical halogen atoms. Methylsulfonyl, ethylsulfonyl, propylsulfonyl, butylsulfonyl, 2-cyanoethylsulfonyl, 2-hydroxyethylsulfonyl, acetyl, propionyl, butyryl, isobutyryl, 3-chloropropionyl, cyanoacetyl, methoxycarbonyl, ethoxycarbonyl, propoxycarbonyl, 2-cyanoethoxycarbonyl, 2-hydroxyethoxycarbonyl, etc. are examples of the alkylsulfonyl, alkanoyl, and alkoxycarbonyl groups which can be present on the phenyl radical represented by R.

Acetamido, propionamido, methylsulfonamido, ethylsulfonamido, and butylsulfonamido are typical alkanoylamino and alkylsulfonamido substituents which can be present on the diazo component. Succinimido, glutarimido, and phthalimido are typical dicarboximido groups. Dimethylsulfamoyl, ethylsulfamoyl, butylsulfamoyl, diethylcarbamoyl, propylcarbamoyl, dibutylcarbamoyl are examples of the alkylsulfamoyl and alkylcarbamoyl groups. The aryl groups which can be present on the diazo component including the aryl moiety of the arylthio, aralkylthio, aroyl and arylsulfonyl groups are preferably monocyclic, carbocyclic aryl such as phenyl and phenyl substituted, for example, with lower alkyl, e.g. tolyl; lower alkoxy, e.g. anisyl; halogen, e.g. chlorophenyl, bromophenyl; nitro, e.g. m-nitrophenyl; etc. Benzoyl, p-toloyl, p-chlorobenzoyl, p-nitrobenzoyl, p-ethoxyphenylthio, p-chlorobenzylthio, benzamido, p-tolylamino, p-tolylsulfonyl, p-ethoxyphenylsulfonyl, benzylthio, m-chlorobenzylthio, etc. are examples of the aryl-containing groups which can be present on the phenyl groups represented by R. The acyl groups set forth below in the definition of R¹ are further examples of the groups which can be present on the diazo component.

Illustrative of the phenyl groups which R can represent are 2-chloro-4-nitrophenyl, 4-nitrophenyl, 2-chloro-4-methylsulfonyl, phenyl, 2,4-di(methylsulfonyl)phenyl, 2-methylsulfonyl-4-nitrophenyl, 2-nitro-4-methylsulfonylphenyl, 2-acetyl-4-nitrophenyl, 2-ethoxycarbonyl-4-nitrophenyl, 2,4 - dinitro-6-chlorophenyl, 2-cyano-4,6-dinitrophenyl, 4 - methoxycarbonylphenyl, 2-ethylsulfonyl-4,6-dinitrophenyl, 2 - formyl-4,6-dinitrophenyl, 2,4-dinitro-6-propionylphenyl, 2-ethoxycarbonyl-4,6-dinitrophenyl, 2-trifluoromethyl - 4 - nitrophenyl, 2,4 - dicyanophenyl, 2-bromo - 6 - cyano-4-nitrophenyl, 4-nitro-2-sulfamoylphenyl, 2 - nitro-4-(dimethylsulfamoyl)phenyl, 4-cyanophenyl, 4-methylsulfonylphenyl, 4 - trifluoromethylphenyl, 4-chlorophenyl, 4-ethylsulfamoylphenyl, 4-acetylphenyl, 4-ethylcarbamoylphenyl, 2 - carbamoyl-4-nitrophenyl, 2-methylsulfonyl-4-thiocyanophenyl, 2,6 - dichloro-4-nitrophenyl, 2-nitro-4-thiocyanatophenyl, 2-chloro-6-cyano-4-nitrophenyl, 2 - cyano-4-nitrophenyl, 2-chloro-4-cyanophenyl, 2-chloro-4-ethoxycarbonylphenyl, and the like.

Preferred phenyl radicals represented by R have the formula

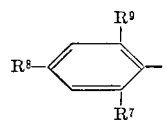

wherein:

$R^7$ is hydrogen, halogen, cyano or nitro;
$R^8$ is nitro, lower alkylsulfonyl, thiocyanato or sulfamoyl; and
$R^9$ is hydrogen, halogen, formyl, lower alkanoyl, lower alkoxycarbonyl, trifluoromethyl, lower alkylsulfonyl, cyano, sulfamoyl, or carbamoyl.

Examples of the alkyl and alkoxy groups and halogen atoms which $R^1$ and $R^2$ can represent are set forth in the preceding description of the groups that can be present on the phenyl diazo components represented by R. The acyl groups, designated A in the substituent —NHA which $R^1$ can represent, can be formyl, lower alkanoyl, aroyl, cyclohexylcarbonyl, lower alkoxycarbonyl, aryloxycarbonyl, lower alkylsulfonyl, arylsulfonyl, carbamoyl, lower alkylcarbamoyl, arylcarbamoyl, furoyl, etc. The alkanoyl, alkoxycarbonyl, and alkylsulfonyl groups can be substituted as described above relative to the description of the alkanoyl, alkoxycarbonyl and alkylsulfonyl groups which can be present on the groups represented by R. Acetyl, propionyl, butyryl, cyanoacetyl, chloroacetyl, phenylacetyl, methoxyacetyl, methylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2 - hydroxyethylsulfonyl, and 2-chloroethylsulfonyl are examples of the alkanoyl, alkoxycarbonyl, and alkylsulfonyl groups which A can represent. The aryl group of the aroyl, aryloxycarbonyl, arylsulfonyl, and arylcarbamoyl group is preferably monocyclic, carbocyclic aryl such as unsubstituted phenyl and phenyl substituted with, for example, lower alkyl, lower alkoxy, halogen, hydroxy, etc. Tolyl, anisyl, p-bromophenyl, and o,p-dichlorophenyl are typical of such aryl groups. Dimethylcarbamoyl, ethylcarbamoyl, propycarbamoyl, and butycarbamoyl are illustrative alkylcarbamoyl groups which A can represent.

The alkylene groups represented by $R^4$ can be straight- or branch-chain alkylene which can be substituted or unsubstituted. Ethylene, propylene, butylene, 2-hydroxypropylene, 2-chloropropylene, 2-bromopropylene, and 2-acetoxypropylene are typical of such alkylene groups.

The alkyl radicals represented by each of $R^3$ and $R^5$ can be unsubstituted or substituted, straight- or branch-chain lower alkyl. Representative examples of such alkyl radicals include methyl, ethyl, propyl, isopropyl, butyl, isobutyl, etc. and lower alkyl substituted, for example, with hydroxy, e.g. 2-hydroxyethyl, 2,3-dihydroxypropyl; lower alkoxy, e.g. 2-methoxyethyl; cyano, e.g. 2-cyanoethyl; lower cyanoalkoxyalkyl, e.g. 2-cyanoethoxyethyl; lower alkanoyloxy, e.g. acetoxyethyl; lower alkoxycarbonyl, e.g. 2-ethoxycarbonylethyl; halogen, e.g. 2-chloroethyl, 3-chloropropyl, 2-bromoethyl, 3-chloro-2-hydroxypropyl; lower alkanoylamino, e.g. 2-acetamidoethyl, 3-propionamidopropyl; carbamoyl, e.g. 2-carbamoylethyl;

lower alkylcarbamoyl, e.g. ethylcarbamoylethyl, 3-dimethylcarbamoylpropyl; phenylcarbamoyloxy, e.g. 2-phenylcarbamoyloxyethyl; lower alkylsulfonyl, e.g. 2-methylsulfonylethyl, lower alkoxycarbonyloxy, e.g. $CH_3OCOOCH_2CH_2$—; dicarboximido, e.g. 3-phthalimidopropyl, 3-glutarimidopropyl; 2-succinimidoethyl; phenoxy, e.g. 2 - phenoxyethyl; lower alkylsulfonamido, e.g. 2-methylsulfonamidoethyl; pyrrolidinono, e.g. 2-(pyrrolidinono)ethyl; piperidono, e.g. 3-(2-piperidono)-propyl; phthalimidino, e.g. 2-phthalimidinoethyl; etc.

The aryl groups which each of $R^3$, $R^5$ and $R^6$ can represent preferably are monocyclic, carbocyclic aryl such as unsubstituted phenyl and phenyl substituted with lower alkyl, e.g. p-tolyl; lower alkoxy, p-anisyl; nitro, e.g. m-nitrophenyl; halogen; e.g. p-bromophenyl, o,p-dichlorophenyl; hydroxy, e.g. p-hydroxyphenyl. Representative aralkyl groups represented by $R_3$ and $R_6$ include lower alkyl substituted with monocyclic, carbocyclic aryl such as the aryl groups specified hereinabove. Specific examples of such aralkyl groups are benzyl, 2-phenylethyl, p-ethylbenzyl, p-methoxycarbonylbenzyl, o,p-dihydroxybenzyl, etc. Examples of the unsubstituted and substituted alkyl groups which $R^6$ can represent are set forth hereinabove in the definition of $R^3$ and $R^5$.

Particularly fast dyeings on polyester materials are obtained from the compounds having the formula

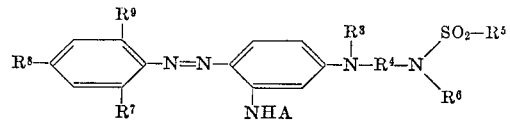

wherein:

$R^7$ is hydrogen, cyano, or nitro;
$R^8$ is nitro, lower alkylsulfonyl, or thiocyanato;
$R^9$ is hydrogen, halogen, formyl, lower alkanoyl, lower alkoxycarbonyl, trifluoromethyl, lower alkylsulfonyl, or cyano;
A is lower alkanoyl, benzoyl, lower alkoxycarbonyl, alkoxycarbonyl, trifluoromethyl, lower alkylsulfonyl,
$R^3$ is lower alkyl, lower alkyl substituted with hydroxy, halogen, lower alkoxy, cyano, or lower alkanoyloxy; or benzyl;
$R^4$ is ethylene or propylene;
$R^5$ is lower alkyl, phenyl or phenyl substituted with lower alkyl, lower alkoxy or halogen; and
$R^6$ is lower alkyl, benzyl, phenyl or phenyl substituted with lower alkyl, lower alkoxy or halogen.

The novel azo compounds of the invention are prepared according to known procedures by diazotizing an aniline having the formula R-NH$_2$ and coupling the resulting diazonium salt with a compound having the formula:

(II)

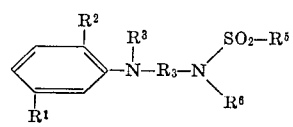

wherein R, $R^1$, $R^2$, $R^3$, $R^4$, $R^5$ and $R^6$ are defined above.

The aniline compounds R-NH$_2$ are known compounds and can be prepared in accordance with published techniques.

The coupler compounds of Formula II are prepared by known methods analagous to procedures described in the literature. The following examples illustrate the procedures which can be used in the preparation of representative compounds of Formula II.

An amount of 27.8 g. of N-ethyl-N-(beta-methanesulfonamido) ethyl-m-toluidine is dissolved as its sodium salt in 100 ml. of water at about 65° C. At this temperature 5.3 g. of acrylonitrile is added dropwise. The product which crystallizes out on cooling to room temperature, is filtered off, washed with water and dried to yield 18 g. of a white solid, M.P. 77–78° C., having the structure:

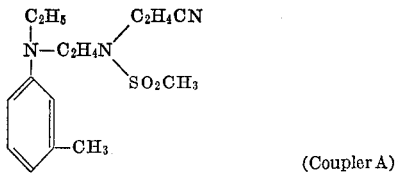
(Coupler A)

This coupler can be further reacted to yield other useful couplers, for example, by contacting Coupler A with sulfuric acid yields the coresponding amide having the formula

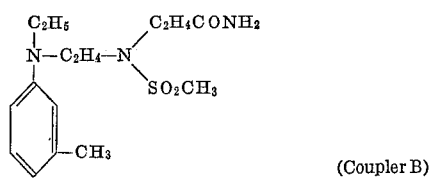
(Coupler B)

A mixture of 19.7 g. N-beta-chloroethyl-N-ethyl-m-toluidine, 13.9 g. N-beta-hydroxyethylmethanesulfonamide, 13.8 g. potassium carbonate and 100 ml. dry dimethyl formamide is stirred and refluxed together for one hour. The reaction is then drowned in water and the organic product extracted with chloroform. Evaporation of the chloroform extract gives the product as a pale yellow oil. It has the structure:

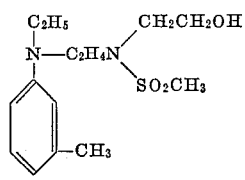

An alternative mode of preparing the above coupler is to react N-ethyl-N-(beta-methanesulfonamido) ethyl-m-toluidine with beta-hydroxyethyl chloride which can be be further reacted with acetic anhydride to yield the esterified derivative thereof or with phosphoryl chloride to give the N-beta-chloroethyl derivative.

N-(2-chloroethyl)-N-ethyl - m - nitroaniline (22.8 g.), methanesulfonanilide (17.1 g.), potassium carbonate (13.8 g.) and N,N-dimethylformamide (100 ml.) are heated with stirring at 135° C. for 2.5 hours. The reaction mixture is drowned in water and the product is filtered off. Recrystallization from 2-methoxy-ethanol gave a purified product having a melting point of 114–115° C. This compound (29.0 g.) is hydrogenated in 250 ml. of ethanol in the presence of Raney nickel at 75° C. and under 1500 p.s.i. The product is dissolved in additional alcohol (200 ml.) and the Raney nickel is removed by filtration. The hydrogenated compound, M.P. 116–118° C., is obtained upon concentrating the filtrate. The amino group present in the above product is acylated by treating 9.9 g. of the hydrogenated product dissolved in 25 ml. of benzene with 3.5 ml. of acetic anhydride. The reaction mixture is refluxed for 1 hour and the product is collected by filtering the cooled reaction mixture. This coupler has the formula

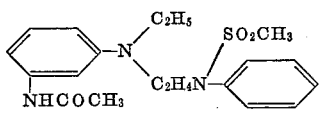

A variety of coupler compounds can be prepared by the substitution of other reactants, such as substituted anilines, aralkyl halides, alkyl- and aryl-sulfonyl halides and acylating agents, well known in the art, for the reactants employed in the above example.

The following examples illustrate the preparation of representative compounds of the invention.

PREPARATION OF THE DYES

Example 1 p-Toluidine (1.07 g.) is dissolved in 10 ml. water containing 3 ml. conc. HCl. The solution is cooled and a solution of 0.72 g. NaNO₂ in 2 ml. water is added at about 8° C. Stirring at ice-bath temperature is continued for 1 hr. This diazonium solution is added to a chilled solution of 3.09 g. N-beta-cyanoethyl-N-methylsulfonyl N'-ethyl-N'-m-tolylethylenediamine, i.e. Coupler A, in 50 ml. 1:5 acid (1 part propionic: 5 parts acetic). The coupling mixture is neutralized to brown on Congo Red paper with solid ammonium acetate, then allowed to couple 3 hr. It it then drowned in water, filtered, washed with water, and dried. The product dyes cellulose acetate, nylon, and polyester fibers a bright yellow shade with outstanding properties on cellulose acetate and nylon. It has the structure:

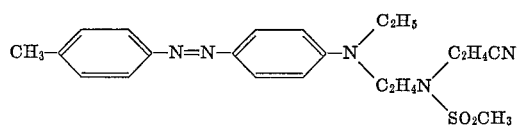

Example 2

Sodium nitrite (3.6 g.) is added portionwise to 25 ml. conc. H₂SO₄. When solution is complete, it is cooled and 50 ml. 1:5 acid is added below 15° C. Then, at about 5° C., 8.6 g. of 2-chloro-4-nitroaniline is added, followed by 50 ml. 1:5 acid at below 5° C. Stirred at this temperature for 4 hr. The diazonium solution is filtered, then added to a chilled solution of 15.45 g. of N-beta-cyanoethyl-N-methylsulfonyl - N' - ethyl-N'-m-tolylethylethylenediamine, i.e. Coupler A, in 250 ml. 1:5 acid. The coupling is neutralized to brown on Congo Red paper and allowed to couple 2 hr. It is then drowned in water, filtered, washed with water, and dried. The product dyes cellulose acetate and polyester fifibers a bordeaux shade of excellent fastness properties. It has the structure:

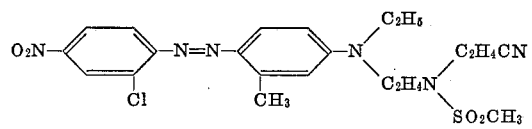

Example 3

2,6-dichloro-4-nitroaniline (6.21 g.) is dissolved in 37.5 ml. conc. H₂SO₄ at 25° C. The solution is chilled and a solution of 2.2 g. NaNO₂ in 15 ml. conc. H₂SO₄ is added below 5° C. The mixture is stirred at 0–5° C. for 2 hr., then added to a chilled solution of 9.27 g. N-beta-cyanoethyl-N-methylsulfonyl - N' - ethyl-N'-m-tolylethylenediamine, i.e. Coupler A, in 250 ml. 15% aqueous H₂SO₄. The coupling mixture is neutralized to brown on Congo Red paper and allowed to couple 2 hr. It is then drowned with water, filtered, washed with water, and dried. The product dyes polyester and cellulose acetate fibers a reddish-brown shade of excellent fastness properties. It has the structure:

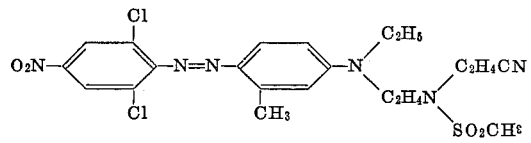

Example 4 p-Chloroaniline (1.27 g.) is dissolved in 10 ml. water containing 3 ml. conc. HCl. The solution is cooled and a solution of 0.72 g. NaNO₂ in 3 ml. water is added at 0–5° C. Stirring at 0–5° C. is continued for 30 minutes. This diazonium salt solution is added to a chilled solution of 3.09 g. N-beta-cyanoethyl-N-methyl-sulfonyl-N'-ethyl-N'-m-tolylethylenediamine in 50 ml. 1:5 acid, all at 0–5° C. The coupling mixture is neutralized to brown on Congo Red paper and allowed to couple 2 hrs. at ice-bath temperature. It is then drowned with water, filtered, washed with water, and air dried. The product dyes cellulose acetate and nylon bright shades of yellow. It has the structure:

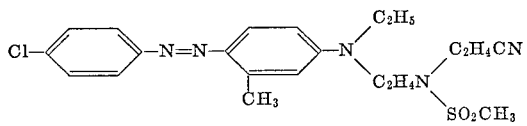

Example 5

An amount of 6.21 g. 2,6-dichloro-4-nitroaniline is diazotized as in Example 3 and added to a solution of 9.0 g. N-beta-hydroxyethyl - N - methylsulfonyl-N'-ethyl-N'-m-tolylethylenediamine in 250 ml. 15% aqueous H₂SO₄, all at about 5° C. The coupling is neutralized to brown on Congo Red paper and allowed to couple 2 hr. The mixture was then drowned in water, and the product collected by filtration, washed with water, and air dried. The product dyes cellulose acetate and polyester fibers a reddish-brown shade of good fastness properties. It was the structure:

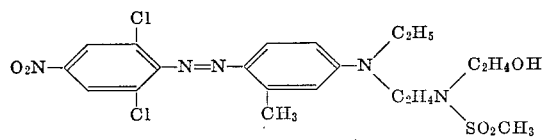

Example 6

In 10 ml. water containing 3 ml. conc. HCl, is dissolved 6.21 g. 2,6-dichloro-4-nitroaniline. The solution is cooled and a solution of 0.72 g. NaNO₂ in 2 ml. water is added at about 8° C. Stirring at ice-bath temperature is continued for one hour. This diazonium solution is added to a chilled solution of 8.85 g. N-beta-cyanoethyl-N-methylsulfonyl-N'-ethyl-N'-phenyl ethylene diamine in 50 ml. of 1:5 acid. The coupling mixture is neutralized to brown on Congo Red paper with solid ammonium acetate, then allowed to couple for three hours. It is then drowned in water, filtered, washed with water and dried. The product dyes polyester fibers a yellow-brown shade of good light and sublimation fastness. It has the structure:

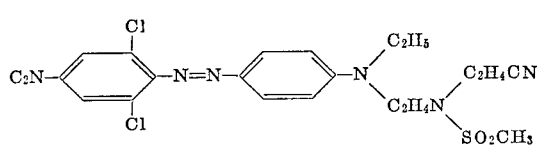

Example 7

To 5 ml. conc. H₂SO₄ is added 0.72 g. of NaNO₂ with stirring. This solution is cooled and 10 ml. 1:5 acid (1 part propionic acid:5 parts acetic acid) is added below 10° C. This is stirred and 1.72 g. 2-chloro-4-nitroaniline is added followed by 10 ml. additional 1:5 acid, all at 0–5° C. The diazotization is stirred at 0–5° C. for 3 hr. and then added to a chilled solution of 3.75 g. N-methylsulfonyl-N-phenyl-N'-(m-acetamidophenyl) - N' - ethylethylenediamine dissolved in 100 ml. of 1:5 acid. The coupling is kept cold (below 5° C.) and buffered with solid ammonium acetate until neutral to Congo Red paper. After allowing to couple for 2 hr., the product is drowned in water, collected by filtration, washed with water and dried in air. The azo compound produces bright red shades on polyester fibers and has the structure:

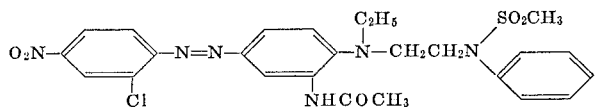

Example 8 p-Nitroaniline (6.9 g.) is dissolved in 5.4 ml. conc. H₂SO₄ and 12.6 ml. water. This solution is poured on 50 g. of crushed ice, and then a solution of 3.6 g. NaNO₂ in 8 ml. water is added all at once. The diazotization is stirred at 0–5° C. for 1 hr., and then the solution is added to a chilled solution of N-methylsulfonyl-N-p-tolyl-N'-(m-acetamidophenyl)-N'-ethylethylene diamine (3.89 g.) dissolved in 250 ml. of 1:5 acid. The coupling is kept at 0–5° C. and neutralized with ammonium acetate until it is neutral to Congo Red paper. After coupling 2 hrs., the mixture is drowned in water. The product is collected by filtration, washed with water, and air dried. It produces bright scarlet shades on polyester fibers and has the structure:

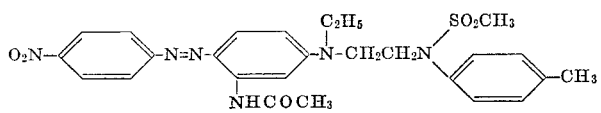

Example 9

2-chloro-4-methylsulfonylaniline (2.05 g.) is diazotized and coupled with N-methylsulfonyl-N-p-tolyl-N'-(m-acetamidophenyl)-N'-ethylethylene diamine according to the procedure described in Example 7. The product, 4-(2'-chloro - 4' - methylsulfonylphenylazo) - 3 - acetamido-N-ethyl-N-(N'-phenyl - N' - methylsulfonylaminoethyl)aniline, imparts fast orange shades to polyester fibers.

Example 10

2-cyano-4,6-dinitroaniline (2.07 g.) is dissolved in 75 ml. of concentrated sulfuric acid at about 0° C. A nitrosyl sulfuric acid solution, prepared by adding 0.72 g. sodium nitrite to 5 ml. of concentrated sulfuric acid is added portionwise at —5 to 0° C. after being stirred 20 minutes at about 0° C., the diazonium solution is added to a cold solution of N-methylsulfonyl-N-phenyl-N'-(m-acetamidophenyl)-N'-ethylethylene diamine (3.75 g.) dissolved in 60 ml. of 15% sulfuric acid plus 40 ml. of 1:5 acid. After allowing to stand for 15 minutes, the coupling mixture is drowned with water. The product is collected by filtration, washed with water, and dried in air. The product gives blue dyeings on polyester and has the structure:

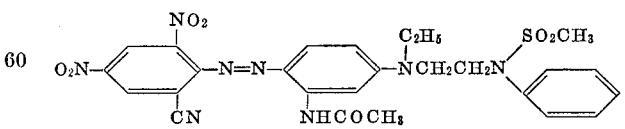

The compounds set forth in the examples of the following table are prepared by coupling the appropriate aniline compound with the appropriate diazotized aniline compound according to the procedure described in the preceding examples. The azo compounds of the table conform to the general formula

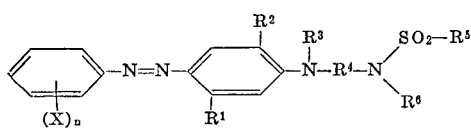

| Example No. | $(X)_n$ | $R^1$ | $R^2$ | $R^3$ | $R^4$ | $R^5$ | $R^6$ | Color |
|---|---|---|---|---|---|---|---|---|
| 11 | 4-NO$_2$ | —CH$_3$ | H | —C$_2$H$_5$ | —CH$_2$CH$_2$— | —CH$_3$ | C$_2$H$_4$CN | Orange. |
| 12 | 4-NO$_2$ | —CH$_3$ | H | —C$_2$H$_5$ | —CH$_2$CH$_2$— | —CH$_3$ | —C$_2$H$_4$Cl | Do. |
| 13 | 4-NO$_2$ | —CH$_3$ | H | —C$_2$H$_5$ | —CH$_2$CH$_2$— | —CH$_3$ | —C$_2$H$_4$OH | Do. |
| 14 | 4-NO$_2$ | —CH$_3$ | H | —C$_2$H$_5$ | —CH$_2$CH$_2$— | —CH$_3$ | —C$_2$H$_4$Br | Do. |
| 15 | 4-NO$_2$ | —CH$_3$ | H | —C$_2$H$_5$ | —CH$_2$CH$_2$— | —CH$_3$ | —C$_2$H$_4$CONH$_2$ | Red. |
| 16 | 2-Cl-4-NO$_2$ | —CH$_3$ | H | —C$_2$H$_5$ | —CH$_2$CH$_2$— | —CH$_3$ | —C$_2$H$_4$CO$_2$C$_2$H$_5$ | Do. |
| 17 | 2-Cl-4-NO$_2$ | —CH$_3$ | H | —C$_2$H$_4$OH | —CH$_2$CH$_2$— | —CH$_3$ | —C$_2$H$_4$CN | Do. |
| 18 | 2-Cl-4-NO$_2$ | —CH$_3$ | H | —C$_2$H$_4$OOCCH$_3$ | —CH$_2$CH$_2$— | —CH$_3$ | —C$_2$H$_4$OOCCH$_3$ | Do. |
| 19 | 2-Cl-4-NO$_2$ | —CH$_3$ | H | —C$_2$H$_4$Cl | —CH$_2$CH$_2$— | —CH$_3$ | —C$_2$H$_4$Cl | Do. |
| 20 | 2-Cl-4-NO$_2$ | —CH$_3$ | H | —C$_2$H$_5$ | —C$_2$H$_6$— | —CH$_3$ | —C$_2$H$_4$OCH$_3$ | Brown. |
| 21 | 2,6-di-Cl-4-NO$_2$ | —CH$_3$ | H | —C$_2$H$_5$ | —CH$_2$CH$_2$— | —CH$_3$ | —C$_2$H$_4$OOCCH$_3$ | Do. |
| 22 | 2,6-di-Cl-4-NO$_2$ | —CH$_3$ | H | —C$_2$H$_5$ | —CH$_2$CH$_2$— | —CH$_3$ | —C$_2$H$_4$CN | Yellowbrown. |
| 23 | 2,6-di-Cl-4-NO$_2$ | H | H | —C$_2$H$_5$ | —CH$_2$CH$_2$— | —C$_2$H$_5$ | —C$_2$H$_4$OH | Do. |
| 24 | 2,6-di-Cl-4-NO$_2$ | H | H | —C$_2$H$_5$ | —CH$_2$CH$_2$— | —C$_2$H$_5$ | C$_2$H$_4$Cl | Do. |
| 25 | 2,6-di-Cl-4-NO$_2$ | H | H | —C$_2$H$_5$ | —CH$_2$CH$_2$— | —C$_2$H$_5$ | | Do. |
| 26 | 2,6-di-Cl-4-NO$_2$ | H | H | —C$_2$H$_5$ | —CH$_2$CH$_2$— | —C$_2$H$_5$ | —C$_2$H$_4$CCNHC$_6$H$_5$ | Do. |
| 27 | 2,6-di-Cl-4-NO$_2$ | CH$_3$ | H | —C$_2$H$_5$ | —CH$_2$CH$_2$— | —C$_2$H$_5$ | —C$_2$H$_4$NHCOCH$_3$ | Yellow. |
| 28 | 4-CH$_3$CO | —OCH$_3$ | H | —C$_2$H$_5$ | —CH$_2$CH$_2$— | —C$_4$H$_9$ | —C$_2$H$_4$CN | Do. |
| 29 | 4-CH$_3$CO | —OCH$_3$ | H | —C$_2$H$_4$Cl | —CH$_2$CH$_2$— | —CH$_3$ | —C$_2$H$_4$OH | Do. |
| 30 | 4-CH$_3$CO | —NHCOCH$_3$ | —OCH$_3$ | —C$_2$H$_4$CONH$_2$ | —CH$_2$CH$_2$— | —CH$_3$ | —C$_2$H$_4$CONH$_2$ | Do. |
| 31 | 4-CH$_3$ | —CH$_3$ | —OCH$_3$ | —C$_2$H$_4$OH | —CH$_2$CH$_2$— | —CH$_3$ | —C$_2$H$_4$CN | Do. |
| 32 | 4-CH$_3$ | —CH$_3$ | H | —C$_2$H$_4$OOCCH$_3$ | —CH$_2$CH$_2$— | —CH$_3$ | —C$_2$H$_4$BrCN | Do. |
| 33 | 4-CH$_3$ | —CH$_3$ | H | —C$_2$H$_5$ | —CH$_2$CH$_2$— | —C$_2$H$_4$Br | —C$_2$H$_4$CN | Orange. |
| 34 | 4-CH$_3$ | —Cl | H | —C$_2$H$_5$ | —CH$_2$CH$_2$— | —C$_2$H$_4$Br | —C$_2$H$_4$CN | Do. |
| 35 | 4-CH$_3$ | —Cl | H | —CH$_2$C$_6$H$_4$CH | —C$_2$H$_5$CH$_2$— | —C$_2$H$_4$Br | —C$_2$H$_4$CN | Do. |
| 36 | 2,6-di-Cl-4-NO$_2$ | —Cl | H | —C$_2$H$_5$ | —CH$_2$CH$_2$— | —CH$_3$ | —C$_2$H$_4$Cl | Yellow. |
| 37 | 4-SO$_2$CH$_3$ | —Cl | H | —C$_2$H$_5$ | —CH$_2$CH$_2$— | —CH$_3$ | —C$_2$H$_4$CN | Do. |
| 38 | 4-SO$_2$CH$_3$ | —OCH$_3$ | H | —C$_2$H$_5$ | —CH$_2$CH$_2$— | —CH$_3$ | —C$_2$H$_4$CN | Dol |
| 39 | 4-SO$_2$CH$_3$ | —OCH$_3$ | H | —C$_2$H$_5$ | —CH$_2$CH$_2$— | —CH$_3$ | —C$_2$H$_4$OCH$_3$ | Orange. |
| 40 | 2,4-di-SO$_2$CH$_3$ | 3-CH$_3$ | H | —C$_2$H$_5$ | —CH$_2$CH$_2$— | —CH$_3$ | —C$_2$H$_4$CN | Red. |
| 41 | 2,4-di-SO$_2$CH$_3$ | 3-CH$_3$ | H | —C$_2$H$_5$ | —CH$_2$CH$_2$— | —CH$_3$ | —C$_2$H$_4$CN | Orange. |
| 42 | 2,4-di-SO$_2$CH$_3$ | 3-CH$_3$ | H | —C$_2$H$_5$ | —CH$_2$CH$_2$— | —CH$_3$ | —C$_2$H$_4$CN | Red. |
| 43 | 3-Cl | 3-CH$_3$ | H | —C$_2$H$_5$ | —CH$_2$CH$_2$— | —CH$_3$ | —C$_2$H$_4$CN | Yellow. |
| 44 | 4-Cl | 3-CH$_3$ | H | —C$_2$H$_5$ | —CH$_2$CH$_2$— | —C$_2$H$_5$ | —C$_2$H$_4$OH | Do. |
| 45 | 2,4-di-Cl | 3-CH$_3$ | H | —C$_2$H$_5$ | —CH$_2$CH$_2$— | —CH$_3$ | —C$_2$H$_4$CN | Do. |
| 46 | 3-CH$_2$OH | 3-CH$_3$ | H | —C$_2$H$_5$ | —CH$_2$CH$_2$— | —CH$_3$ | —C$_2$H$_4$CN | Do. |
| 47 | 3-CH$_2$OH | 3-CH$_3$ | H | —C$_2$H$_5$ | —CH$_2$CH$_2$— | —CH$_3$ | —C$_2$H$_4$CN | Do. |
| 48 | 4-NHSO$_2$CH$_3$ | 3-CH$_3$ | H | —C$_2$H$_5$ | —CH$_2$CH$_2$— | —CH$_3$ | —C$_2$H$_4$CN | Do. |
| 49 | 4-NHSO$_2$CH$_3$ | 3-CH$_3$ | H | —C$_2$H$_5$ | —CH$_2$CH$_2$— | —CH$_3$ | —C$_2$H$_4$CN | Do. |
| 50 | 4-CN | 3-CH$_3$ | H | —C$_2$H$_5$ | —CH$_2$CH$_2$— | —CH$_3$ | C$_2$H$_4$CN | Orange. |
| 51 | 4-CF$_3$ | —NHCOCH$_3$ | H | —C$_2$H$_5$ | —CH$_2$CH$_2$— | —CH$_3$ | —C$_2$H$_4$OH | Brown. |
| 52 | 2,6-di-Cl-4-NO$_2$ | —NHCONHC$_2$H$_5$ | H | —C$_2$H$_5$ | —CH$_2$CH$_2$— | —CH$_3$ | —C$_2$H$_4$OH | Red. |
| 53 | 2,6-di-Cl-4-NO$_2$ | —NHSO$_2$CH$_3$ | H | —C$_2$H$_5$ | —CH$_2$CH$_2$— | —CH$_3$ | —C$_2$H$_4$CN | Red. |
| 54 | 2-Cl-4-NO$_2$ | —NHSO$_2$C$_6$H$_5$ | H | —C$_2$H$_5$ | —CH$_2$CH$_2$— | C$_6$H$_5$ | —C$_6$H$_4$-p-CH$_3$ | Do. |
| 55 | 2-Cl-4-NO$_2$ | —NHSO$_2$C$_6$H$_4$-p-CH$_3$ | H | —C$_2$H$_5$ | —CH$_2$CH$_2$— | —C$_6$H$_5$ | —C$_6$H$_4$-p-OCH$_3$ | Yellow. |
| 56 | 2-Cl-4-NO$_2$ | —NHSO$_2$CH$_3$ | H | —CH$_3$ | —CH$_2$CH$_2$— | —CH$_3$ | —C$_6$H$_4$-p-CH$_3$ | Do. |
| 57 | 2-Cl-4-NO$_2$ | —NHSO$_2$CH$_3$ | H | —C$_2$H$_5$ | —CH$_2$CH$_2$— | —CH$_3$ | —C$_6$H$_5$ | Do. |
| 58 | 2-Cl-4-NO$_2$ | —NHCOCH$_3$ | H | —C$_2$H$_5$ | —CH$_2$CH$_2$— | —CH$_3$ | —C$_6$H$_5$ | Orange. |
| 59 | 2-Cl-4-NO$_2$ | —NHCOCH$_3$ | H | —C$_2$H$_5$ | —CH$_2$CH$_2$— | —CH$_3$ | —C$_6$H$_5$ | Do. |
| 60 | 2-Cl-4-NO$_2$ | —NHCOCH$_3$ | H | —C$_2$H$_5$ | —(CH$_2$)$_3$— | —CH$_3$ | —C$_6$H$_5$ | Do. |
| 61 | 2-Br-4-NO$_2$ | —NHCOC$_6$H$_5$ | H | —CH$_2$C$_6$H$_5$ | —CH$_2$CHCH$_2$— (OH) | —CH$_3$ | —CH$_3$ | Scarlet. |
| 62 | 4-NO$_2$ | —NHCOOC$_2$H$_5$ | H | —C$_2$H$_4$CN | —CH$_2$CH$_2$— | —CH$_3$ | —C$_6$H$_5$ | Do. |
| 63 | 4-NO$_2$ | —NHCOCH$_3$ | H | —C$_2$H$_5$OOCCH$_3$ | —CH$_2$CH$_2$— | —CH$_3$ | —C$_6$H$_4$-p-CH$_3$ | Do. |
| 64 | 4-NO$_2$ | —NHCONHC$_6$H$_5$ | H | —CH$_2$CH(CH$_3$)$_2$ | —CH$_2$CH$_2$— | —C$_2$H$_5$ | —C$_6$H$_4$-p-OCH$_3$ | Do. |
| 65 | 4-NO$_2$ | —NHCOC$_6$H$_5$ | H | —CH$_3$ | —CH$_2$CH$_2$— | —CH$_3$ | —C$_2$H$_4$CN | Do. |
| 66 | 4-NO$_2$ | —NHCOCH$_3$ | H | —C$_2$H$_5$ | —CH$_2$CH$_2$— | —CH$_3$ | —C$_6$H$_5$ | Do. |
| 67 | 4-NO$_2$ | —NHCOCH$_3$ | H | —C$_2$H$_5$ | —CH$_2$CH$_2$— | —CH$_3$ | —C$_6$H$_5$ | Do. |
| 68 | 4-NO$_2$ | —NHCOCH$_3$ | H | —C$_2$H$_5$ | —CH$_2$CH$_2$— | —CH$_3$ | —C$_6$H$_5$ | Do. |
| 69 | 4-NO$_2$ | —NHSO$_2$CH$_3$ | H | —C$_2$H$_5$ | —CH$_2$CH$_2$— | —CH$_3$ | —C$_6$H$_5$ | Do. |
| 70 | 2-CN-4-NO$_2$ | —NHSO$_2$C$_6$H$_5$ | H | —C$_2$H$_5$ | —CH$_2$CH$_2$— | —CH$_3$ | —C$_6$H$_5$ | Rubine. |
| 71 | 2-CN-4-NO$_2$ | —NHCOCH$_3$ | H | —C$_2$H$_5$ | —CH$_2$CH$_2$— | —CH$_3$ | —C$_6$H$_4$-p-CH$_3$ | Do. |
| 72 | 2-CN-4-NO$_2$ | —NHCOCH$_3$ | H | —C$_2$H$_5$ | —CH$_2$CH$_2$— | —CH$_3$ | —C$_6$H$_4$-p-CH$_3$ | Do. |
| 73 | 2-CN-4-NO$_2$ | —NHCOCH$_3$ | H | —C$_2$H$_5$ | —CH$_2$CH$_2$— | —CH$_3$ | —C$_6$H$_4$-p-CH$_3$ | Do. |

3,546,204

TABLE—Continued

| | (X)$_n$ | R$^1$ | R$^2$ | R$^3$ | R$^4$ | R$^5$ | R$^6$ | Color |
|---|---|---|---|---|---|---|---|---|
| 74 | 2-CN-4,6-di-NO$_2$ | —NHCOCH$_3$ | H | —C$_2$H$_5$ | —CH$_2$CH$_2$— | —CH$_3$ | —C$_6$H$_4$-p-CH$_3$ | Blue. |
| 75 | 2-CN-4,6-di-NO$_2$ | —NHSO$_2$CH$_3$ | H | —C$_2$H$_5$ | —(CH$_2$)$_3$— | —CH$_3$ | —C$_6$H$_5$ | Do. |
| 76 | 2-CN-4,6-di-NO$_2$ | —NHCOCH$_3$ | —CH$_3$ | H | —CH$_2$CH$_2$— | —C$_6$H$_4$-p-Cl | —CH$_2$C$_6$H$_5$ | Do. |
| 77 | 2-CN-4,6-di-NO$_2$ | —NHCHO | —OC$_2$H$_5$ | —C$_2$H$_4$CN | —CH$_2$CH$_2$— | —C$_2$H$_5$ | —C$_6$H$_5$ | Do. |
| 78 | 2-CN-4,6-di-NO$_2$ | —NHCOC$_6$H$_5$ | H | —C$_2$H$_5$ | —CH$_2$CH$_2$— | —CH$_3$ | —CH$_3$ | Do. |
| 79 | 2-CN-4,6-di-NO$_2$ | —NHCOOCH$_3$ | —OCH$_3$ | —C$_2$H$_5$ | —CH$_2$CH$_2$— | —CH$_3$ | —C$_6$H$_5$ | Do. |
| 80 | 2-Cl-4,6-di-NO$_2$ | —NHCOCH$_3$ | —OCH$_3$ | —C$_2$H$_5$ | —CH$_2$CH$_2$— | —CH$_3$ | —C$_6$H$_5$ | Do. |
| 81 | 2-Cl-4,6-di-NO$_2$ | —NHSO$_2$C$_6$H$_4$-p-Br | —OCH$_3$ | —C$_2$H$_5$ | —CH$_2$CH$_2$— | —CH$_3$ | —C$_6$H$_4$-p-OCH$_3$ | Do. |
| 82 | 2-Cl-4,6-di-NO$_2$ | —NHCOCH$_2$OH | —OCH$_3$ | —C$_2$H$_5$ | —CH$_2$CH$_2$ | —C$_6$H$_4$-p-CH$_3$ | 2-thiazolyl | Do. |
| 83 | 2-Cl-4,6-di-NO$_2$ | —NHCOCH$_2$OCH$_3$ | —OCH$_3$ | —C$_2$H$_5$ | —CH$_2$CH$_2$— | —C$_6$H$_4$-p-CH$_3$ | β-naphthyl | Do. |
| 84 | 2-Cl-4,6-di-NO$_2$ | —NHCOCH$_3$ | —OCH$_3$ | —C$_2$H$_5$ | —CH$_2$CH$_2$— | —CH$_3$ | 3-pyridyl | Do. |
| 85 | 2-Br-4,6-di-NO$_2$ | —NHCOCH$_3$ | H | —C$_2$H$_5$ | —CH$_2$CH$_2$— | —CH$_3$ | —C$_6$H$_5$ | Do. |
| 86 | 2-Br-4-SO$_2$OCH$_3$ | —NHSO$_2$CH$_3$ | H | —C$_2$H$_5$ | —CH$_2$CH$_2$— | —CH$_3$ | —C$_4$H$_5$ | Scarlet. |
| 87 | 2-Cl-4-SO$_2$CH$_3$ | —NHCOCH$_3$ | H | —C$_2$H$_5$ | —CH$_2$CHCH$_2$—OOCCH$_3$ | —CH$_3$ | —C$_2$H$_4$N(COCH$_2$)(CH$_2$CH$_2$) | Do. |
| 88 | 2-Br-4-SO$_2$C$_2$H$_5$ | —NHCOCH$_3$ | H | —C$_2$H$_5$ | —CH$_2$CH$_2$— | —CH$_3$ | —C$_6$H$_5$ | Do. |
| 89 | 4-SO$_2$CH$_3$ | —NHCOCH$_3$ | H | —C$_2$H$_5$OH | —CH$_2$CH$_2$— | —CH$_3$ | —C$_6$H$_4$-p-CH$_3$ | Orange. |
| 90 | 4-SO$_2$CH$_3$ | —NHCOCH$_2$ | H | —C$_2$H$_5$ | —CH$_2$CH$_2$— | —CH$_3$ | 1,2,4-triazol-3-yl | Do. |
| 91 | 2,4-di-SO$_2$CH$_3$ | —NHCOOCH$_3$ | —OCH$_3$ | —C$_2$H$_5$ | —CH$_2$CH$_2$— | —CH$_3$ | —CH$_2$C$_6$H$_5$ | Red. |
| 92 | 3,4-di-SO$_2$CH$_3$ | —NHCOC$_6$H$_5$ | H | —C$_2$H$_5$ | —CH$_2$CH$_2$— | —CH$_3$ | —C$_2$H$_5$ | Violet. |
| 93 | 2,4-di-SO$_2$CH$_3$ | —NHSO$_2$NH$_2$ | H | —C$_2$H$_5$ | —CH$_2$CH$_2$— | —C$_6$H$_4$-p-Cl | —C$_6$H$_4$-p-Cl | Red. |
| 94 | 4-SO$_2$NH$_2$ | —NHCOC$_2$H$_5$CN | H | —C$_2$H$_5$ | —CH$_2$CH$_2$— | —CH$_3$ | —C$_6$H$_4$-p-CH$_3$ | Red. |
| 95 | 4-COOC$_2$H$_5$ | —NHCOCH$_3$ | H | —C$_2$H$_5$ | —(CH$_2$)$_3$— | —CH$_3$ | —C$_6$H$_4$-p-OCH$_3$ | Orange. |
| 96 | 4-CN | —NHSO$_2$C$_2$H$_4$-p-CH$_3$ | H | —C$_2$H$_5$ | —CH$_2$CH$_2$— | —CH$_3$ | —C$_6$H$_5$ | Do. |
| 97 | 4-CN | —NHCOCH$_3$ | H | —C$_2$H$_5$ | —CH$_2$CH$_2$— | —CH$_3$ | —CH$_2$C$_6$H$_5$ | Do. |
| 98 | 2,4-di-CN | —NHCOCH$_3$ | H | —C$_2$H$_5$ | —CH$_2$CH$_2$— | —CH$_3$ | —C$_6$H$_5$ | Red. |
| 99 | 2,4-di-CN | —NHSO$_2$C$_2$H$_4$Cl | H | —C$_2$H$_5$ | —CH$_2$CH$_2$— | —CH$_3$ | —C$_6$H$_5$ | Red. |
| 100 | 2-Cl-COOCH$_3$ | —NHSO$_2$C$_2$H$_4$CN | H | —C$_2$H$_5$ | —CH$_2$CHCH$_2$—Cl | —CH$_3$ | —C$_6$H$_5$ | Do. |
| 101 | 2-Cl-4-CN | —NHCOCF$_3$ | H | —C$_2$H$_5$ | —CH$_2$CH$_2$— | —CH$_3$ | —C$_6$H$_4$-p-OCH$_3$ | Do. |
| 102 | 4-CHO | —NHCOC$_6$H$_4$-p-NO$_2$ | H | —CH$_3$ | —CH$_2$CH$_2$— | —CH$_3$ | —C$_6$H$_4$-p-CH$_3$ | Orange. |
| 103 | 4-COCH$_3$ | —NHCOCH$_2$CH(CH$_3$)$_2$ | H | —CH$_2$C$_6$H$_5$ | —CH$_2$CH$_2$— | —CH$_3$ | —C$_6$H$_5$ | Do. |
| 104 | 4-CF$_3$ | —NHCOCH$_3$ | H | —CH$_2$C$_6$H$_5$ | —CH$_2$CH$_2$— | —CH$_3$ | 2-benzothiazolyl | Red. |
| 105 | 2-CF$_3$-4-NO$_2$ | —NHSO$_2$CH$_3$ | H | —C$_2$H$_5$ | —CH$_2$CN$_2$ | —C$_2$H$_5$ | —C$_6$H$_5$ | Do. |
| 106 | 3,5-di-COOCH$_3$ | —NHCOOC$_2$H$_5$ | H | —C$_2$H$_5$ | —CH$_2$CH$_2$— | —C$_6$H$_4$-p-Cl | —C$_6$H$_5$ | Orange. |
| 107 | 2-NO$_2$-4-SCN | —NHCOC$_2$H$_5$ | H | —CH(CH$_3$)$_2$ | —CH$_2$CH$_2$— | —CH$_3$ | —C$_6$H$_4$-p-OCH$_3$ | Red. |
| 108 | 2-NO$_2$-4-SCN | —NHCOCH$_3$ | H | —C$_6$H$_11$ | —CH$_2$CH$_2$— | —CH$_3$ | —C$_6$H$_5$ | Red. |
| 109 | 2-Cl-4-NO$_2$-6-CN | —NHCOCH$_3$ | Cl | —C$_2$H$_5$ | —CH$_2$CH$_2$— | —CH$_3$ | —C$_6$H$_5$ | Reddish-blue. |
| 110 | 4-Cl | —NHCHO | H | —C$_2$H$_5$ | —CH$_2$CH$_2$— | —CH$_3$ | —CH$_2$C$_6$H$_5$ | Yellow. |
| 111 | 2-COCH$_3$-4-NO$_2$ | —NHCOCH$_3$ | H | —C$_2$H$_5$ | —CH$_2$CH$_2$— | —CH$_3$ | —C$_6$H$_4$-p-NO$_2$ | Red. |
| 112 | 2-COCH$_3$-4-NO$_2$ | —NHCOC$_6$H$_5$ | H | —C$_2$H$_5$ | —CH$_2$CH$_2$— | —CH$_3$ | —C$_6$H$_5$ | Violet. |
| 113 | 2-CONH$_2$-4-NO$_2$ | —NHCOCH$_2$SCH$_3$ | H | —C$_2$H$_5$ | —CH$_2$CH$_2$— | —CH | —C$_6$H$_5$ | Blue. |
| 114 | 2,4-di-NO$_2$-6-SO$_2$CH$_3$ | —NHCOCH$_3$ | H | —C$_2$H$_5$ | —CH$_2$CH$_2$— | —CH$_3$ | —CH$_2$C$_6$H$_5$ | Do. |
| 115 | 2,4-di-NO$_2$-6-SO$_2$NHC$_2$H$_5$ | —NHCOC$_6$H$_4$-m-CH$_3$ | H | —C$_2$H$_5$ | —CH$_2$CH$_2$— | —C$_6$H$_4$-p-Cl | —C$_6$H$_5$ | Do. |
| 116 | 2-COOCH$_3$-4,6-di-NO$_2$ | —NHCHO | H | —C$_2$H$_5$ | —CH$_2$CH$_2$— | —CH$_3$ | —C$_6$H$_5$ | Do. |
| 117 | 2-COOCH$_3$-4,6-di-NO$_2$ | —NHCOCH$_3$ | H | —C$_2$H$_5$ | —CH$_2$CH$_2$— | —CH$_3$ | —C$_6$H$_5$ | Do. |
| 118 | 2-COOCH$_3$-4,6-di-NO$_2$ | —NHCOC$_6$H$_5$ | H | —C$_2$H$_5$ | —CH$_2$CH$_2$— | —CH$_3$ | —C$_6$H$_5$ | Do. |
| 119 | 2-COOCH$_3$-4,6-di-NO$_2$ | —NHSO$_2$C$_6$H$_5$ | H | —C$_2$H$_5$ | —CH$_2$CH$_2$— | —CH$_3$ | —CH$_2$C$_6$H$_5$ | Do. |
| 120 | 2-CF$_3$-4,6-di-NO$_2$ | —NHCOOCH$_3$ | H | —C$_6$H$_5$ | —CH$_2$CH$_2$— | —CH$_3$ | —C$_6$H$_4$-p-CH$_3$ | Do. |
| 121 | 2-COCH$_3$-4,6-di-Br | —NHCONHC$_2$H$_5$ | H | —C$_2$H$_5$ | —CH$_2$CH$_2$— | —CH$_3$ | —C$_2$H$_4$CN | Red. |
| 122 | 4-SO$_2$NH$_2$ | —NHCOCH$_3$ | H | —C$_2$H$_5$ | —CH$_2$CH$_2$— | —NH$_2$ | —C$_6$H$_4$-p-CH$_3$ | Orange. |
| 123 | 2,4-di-SO$_2$NH$_2$ | —NHCOCH$_3$ | H | —C$_2$H$_5$ | —CH$_2$CH$_2$— | —C$_6$H$_4$-p-CH$_3$ | —C$_6$H$_5$ | Red. |
| 124 | 2-SO$_2$CH$_3$ | —NHCOCH$_3$ | H | —C$_2$H$_5$ | —CH$_2$CH$_2$— | —CH$_3$ | —CH$_2$C$_6$H$_5$ | Orange. |
| 125 | 2-SO$_2$CH$_3$-4-SCN | —NHCOCH$_3$ | H | —C$_2$H$_5$ | —CH$_2$CH$_2$— | —CH$_3$ | —CH$_2$C$_6$H$_5$ | Scarlet. |
| 126 | 2-SO$_2$N(CH$_3$)$_2$-4-NO$_2$ | —NHCOCH$_3$ | H | —C$_2$H$_5$ | —CH$_2$CH$_2$— | —CH$_3$ | —C$_6$H$_5$ | Red. |
| 127 | 4-CHO | —NHCOCH$_3$ | H | —C$_2$H$_5$ | —CH$_2$CH$_2$— | —CH$_3$ | —C$_6$H$_5$ | Orange. |
| 128 | 4-CONH$_2$ | —NHCOCH$_3$ | H | —C$_2$H$_5$ | —CH$_2$CH$_2$— | —CH$_3$ | —C$_6$H$_5$ | Do. |

The compounds of the invention can be used for dyeing linear polyester, cellulose acetate, and polyamide textile materials in the manner described in U.S. Pats. 2,880,050, 2,757,064, 2,782,187 and 3,043,827. The following example illustrates a carrier dyeing procedure for applying the azo compounds of the invention to polyester textile materials.

Example 161

An amount of 0.1 g. of the azo compound is dissolved in 10 cc. of 2-methoxyethanol. A small amount (3–5 cc.) of a 3% sodium lignin sulfonate aqueous solution is added, with stirring, and then the volume of the bath is brought to 300 cc. with water. 3 cc. of an anionic solvent carrier (Tanavol) is added to the bath and 10 grams of a textile fabric made of poly(ethylene terephthalate) fibers is placed in the bath and worked 10 minutes without heat. The dyeing is carried out at the boil for one hour. The dyed fabric is removed from the dyebath and scoured for 20 minutes at 80° C. in a solution containing 1 g./l. neutral soap and 1 g./l. sodium carbonate. The fabric is then rinsed, dried in an oven at 250° F. and heat set (for the removal of residual carrier) for 5 minutes at 350° C.

When the compounds of the invention are used to dye polyamide tetxile materials, the above procedure can be employed except the "Tanavol" dyeing assistant need not be used and the heat setting is omitted. When cellulose acetate fibers are dyed with the compounds, the above procedure can be followed omitting the "Tanavol" dyeing assistant, carrying out the dyeing at 80° C. for one hour rather than at the boil, and omitting the heat setting of the dyed fabric.

The compounds of the invention can also be applied to polyester textile materials by the heat fixation technique described in U.S. Pat. 2,663,612 and in the American Dyestuff Reporter, 42, 1 (1953). The following procedure describes how the azo compounds of the invention can be applied to polyester materials by the heat fixation technique.

Example 162

A mixture of:
500 mg. of the compound of Example 7, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a micro-size container (an accessory for a 1-quart size Szegvari Attritor) for approximately 3.5 hours. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring.

A thickener and penetrating mixture is prepared by mixing 1 ml. of a complex diaryl sulfonate surfactant, (Compound 8–S),
3 ml. of a 3% solution of a sodium N-methyl-N-oleoyltaurate (Igepon T–S1), 8 ml. of a 25% solution of natural gums (Superclear 80N), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the resevoir of a Butterworth padder where it is heated to about 45–60° C.

10 g. of a fabric of poly(ethylene terephthalate) fibers and 10 g. of a fabric of 65/35 spun poly(ethylene terephthalate)/cotton fibers are sewn together, end-to-end, and padded for 5 minutes of continuous cycling through the dye mixture and between three rubber squeeze rollers of the padder. Dye mixture pick-up is about 60% based on the weight of the fabrics.

The padded fabrics are then dried at 200° F. and then heat-fixed for 2 minutes at 415° F. in a forced air oven. The dyed fabrics are scoured for 20 minutes at 65–70° C. in a solution containing 0.2% sodium hydrosulfite, 0.2% sodium carbonate and 1.7% of a 3% solution of sodium N-methyl-N-oleoyltaurate and then dried. The dyed fabrics possess excellent brightness and exhibit outstanding fastness to light and sublimation when tested according to the procedures described in the 1966 edition of the Technical Manual of the American Association of Textile Chemists and Colorists.

The heat fixation dyeing procedure described above can be varied by the substitution of other dispersing agents, surfactants, suspending agents, thickeners, etc. The temperature and time of the heat-fixation step can also be varied.

Polymeric linear polyester materials of the terephthalate type sold under the trademarks "Kodel," "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,446. Poly(ethylene terephthalate) polyester fibers are described, for example, in U.S. Pat. 2,465,319. The polymeric linear polyester materials disclosed in U.S. Pats. 2,945,010, 2,957,-745, and 2,989,363, for example, can be dyed. The linear aromatic polyester materials specifically named have a melting point of at least 200° C. The poly(ethylene terephthalate fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These inherent viscosities are measured at 25° C. using 0.25 g. polymer per 100 ml. of a solvent consisting of 60% phenol and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc.

Examples of the polyamide fibers that can be dyed with compounds of the invention are those consisting of nylon 66, made by the polymerization of adipic acid and hexamethylenediamine, nylon 6, prepared from epsilon-aminocaproic acid lactam, and nylon 8. The cellulose acetate fibers that can be dyed with the compounds of the invention include fibers consisting of either cellulose triacetate or partially hydrolyzed cellulose acetate.

The invention has been described in considerable detail with particular reference to preferred embodiments thereof, but it will be understood that variations and modifications can be effected within the spirit and scope of the invention as described hereinabove.

We claim:
1. A water-insoluble monoazo compound having the formula

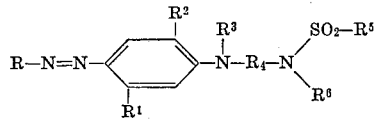

wherein:

R is a phenyl radical;
$R^1$ is hydrogen, lower alkyl, lower alkoxy, chlorine, bromine or the group —NHA in which A is formyl, lower alkanoyl, lower chloroalkanoyl, lower bromoalkanoyl, lower phenylalkanoyl, lower cyanoalkanoyl, lower alkoxyalkanoyl, lower alkylthioalkanoyl, lower alkylsulfonylalkanoyl, benzoyl, lower alkyl benzoyl, lower alkoxybenzoyl, chlorobenzoyl, bromobenzoyl, cyclohexylcarbonyl, lower alkoxycarbonyl, lower cyanoalkoxycarbonyl, lower hydroxyalkoxycarbonyl, phenoxycarbonyl, lower alkylphenoxycarbonyl, lower alkoxyphenoxycarbonyl, chlorophenoxycarbonyl, bromophenoxycarbonyl, lower alkylsulfonyl, lower cyanoalkylsulfonyl, lower chloroalkylsulfonyl, bromoalkylsulfonyl, phenylsulfonyl, lower alkylphenylsulfonyl, lower alkoxyphenylsulfonyl, chlorophenylsulfonyl, bromophenylsulfonyl, carbamoyl, lower alkylcarbamoyl, di-lower alkylcarbamoyl, phenylcarbamoyl, lower alkylphenylcarbamoyl, lower alkoxyphenylcarbamoyl, chlorophenylcarbamoyl, or bromophenylcarbamoyl;

$R^2$ is hydrogen, lower alkyl, or lower alkoxy;

$R^3$ is hydrogen; lower alkyl; lower alkyl substituted with hydroxy, lower alkoxy, cyano, lower alkanoyloxy, lower alkoxycarbonyl, chlorine, bromine, lower alkanoylamino, carbamoyl, lower alkylcarbamoyl, phenylcarbamoyloxy, lower alkylsulfonyl, lower alkoxycarbonyloxy, succinimido, glutarimido, phthalimido, phenyl, lower alkylphenyl, lower alkoxyphenyl, hydroxyphenyl, chlorophenyl bromophenyl, phenoxy, lower alkylsulfonamido, cyclohexyl; phenyl; or phenyl substituted with lower alkyl, lower alkoxy, hydroxy, chlorine, bromine, or nitro;

$R^4$ is lower alkylene or lower alkylene substituted with hydroxy, chlorine, bromine, or lower alkanoyloxy;

$R^5$ is lower alkyl, lower chloroalkyl, bromoalkyl, cyclohexyl, amino, phenyl or phenyl substituted with lower alkyl, lower alkoxy, hydroxy, chlorine, bromine or nitro; and $R^6$ is lower alkyl substituted with hydroxy, chlorine, bromine, cyano, lower alkanoyloxy, lower alkoxy, lower alkanoylamino, lower alkylsulfonyl, carbamoyl, lower alkoxycarbonyl, phenylcarbamoyloxy, phenyl or phenyl substituted with lower alkyl, lower alkoxy, hydroxy, chlorine, bromine, or nitro; cyclohexyl; phenyl; phenyl substituted with lower alkyl, lower alkoxy, hydroxy, chlorine, bromine, or nitro; naphthyl; or, when $R^1$ is —NHA, lower alkyl.

2. A compound according to claim 1 wherein R is a group having the formula

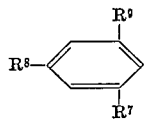

wherein:

$R^7$ is hydrogen, chlorine, bromine, cyano, or nitro;
$R^8$ is nitro, lower alkylsulfonyl, thiocyanato, or sulfamoyl; and
$R^9$ is hydrogen, halogen, formyl, lower alkanoyl, lower alkoxycarbonyl, trifluoromethyl, lower alkylsulfonyl, cyano, sulfamoyl, or carbamoyl.

3. A compound according to claim 1 having the formula

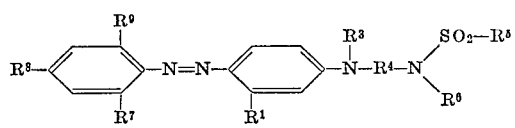

wherein:

$R^7$ is hydrogen, chlorine, bromine or lower alkylsulfonyl;
$R^8$ is nitro, lower alkanoyl, lower alkyl, lower alkylsulfonyl, chlorine, bromine, lower alkanoylamino, lower alkylsulfonamido, cyano, or trifluoromethyl;
$R^9$ is hydrogen, chlorine or bromine;
$R^1$ is hydrogen, lower alkyl, lower alkoxy, chlorine, bromine or lower alkanoylamino;
$R^3$ is lower alkyl; lower alkyl substituted with hydroxy, lower alkoxy, cyano, lower alkanoyloxy, lower alkoxycarbonyl chlorine, bromine, or carbamoyl; benzyl; phenyl; or phenyl substituted with lower alkyl; lower alkoxy, chlorine, bromine or nitro;
$R^4$ is lower alkylene;
$R^5$ is lower alkyl, lower chloroalkyl, lower bromoalkyl, phenyl, or lower alkylphenyl; and
$R^6$ is lower alkyl substituted with cyano, chlorine, bromine, hydroxy, carbamoyl, lower alkoxycarbamoyl, lower alkanoyloxy, lower alkoxy, phenylcarbamoyloxy, lower alkanoylamino; phenyl; or phenyl substituted with lower alkyl, lower alkoxy, chlorine or bromine.

4. A compound according to claim 1 having the formula

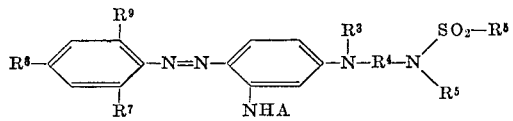

wherein:

$R^7$ is hydrogen, cyano or nitro;
$R^8$ is nitro, lower alkylsulfonyl, or thiocyanato;
$R^9$ is hydrogen, chlorine, bromine, formyl, lower alkanoyl, lower alkoxycarbonyl, trifluoromethyl, lower alkylsulfonyl, or cyano;
A is lower alkanoyl, benzoyl, lower alkoxycarbonyl, lower alkylsulfonyl, or lower alkylcarbamoyl;
$R^3$ is lower alkyl; lower alkyl substituted with hydroxy, chlorine, bromine, lower alkoxy, cyano, or lower alkanoyloxy; or benzyl;
$R^4$ is ethylene or propylene;
$R^5$ is lower alkyl, phenyl or phenyl substituted with lower alkyl, lower alkoxy, chlorine, or bromine; and
$R^6$ is lower alkyl, benzyl, phenyl, or phenyl substituted with lower alkyl, lower alkoxy, chlorine or bromine.

5. A compound according to claim 1 having the formula

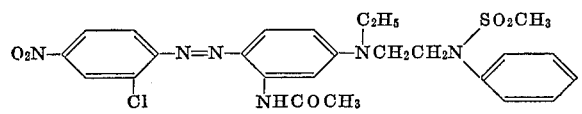

6. A compound according to claim 1 having the formula

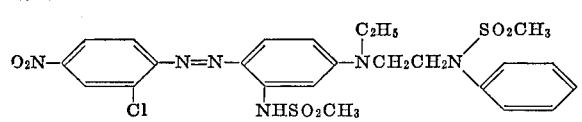

7. A compound according to claim 1 having the formula

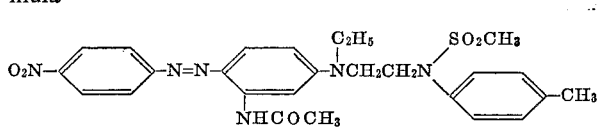

8. A compound according to claim 1 having the formula

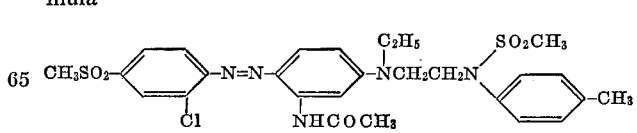

9. A compound according to claim 1 having the formula

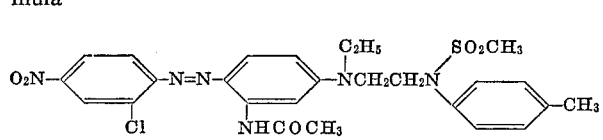

10. A compound according to claim 1 having the formula
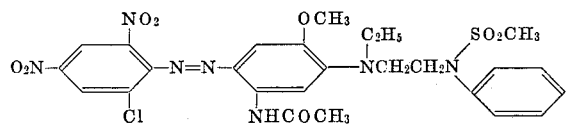
11. A compound according to claim 1 having the formula
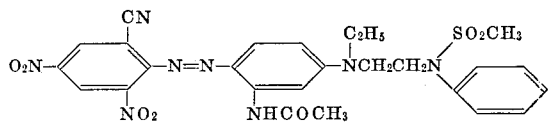
References Cited
UNITED STATES PATENTS
| | | | |
|---|---|---|---|
| 2,238,485 | 4/1941 | Dickey et al. | 260—207(X) |
| 3,206,454 | 9/1965 | Merian et al. | 260—207(X) |
| 3,398,135 | 8/1968 | Mueller | 260—207.1(X) |
| 2,955,901 | 10/1960 | Kruckenberg | 260—205(X) |
CHARLES B. PARKER, Primary Examiner
C. F. WARREN, Assistant Examiner
U.S. Cl. X.R.
260—152, 153, 155, 156, 157, 158, 206, 207, 207.1, 207.3, 207.5, 556, 570.5; 8—41, 50

UNITED STATES PATENT OFFICE
CERTIFICATE OF CORRECTION

Patent No. 3,546,204     Dated December 8, 1970

Inventor(s) Max A. Weaver and David J. Wallace     PAGE - 1

It is certified that error appears in the above-identified patent and that said Letters Patent are hereby corrected as shown below:

Column 2, line 22, after "butyl" insert ---methoxy---.

Column 3, line 56, "butycarbamoyl" should be ---butylcarbamoyl---.

Column 4, line 43, cancel "alkoxycarbonyl, trifluoromethyl" and after "alkylsulfonyl," insert ---or lower alkylcarbamoyl--

Column 4, lines 57 through 64, the formula should read

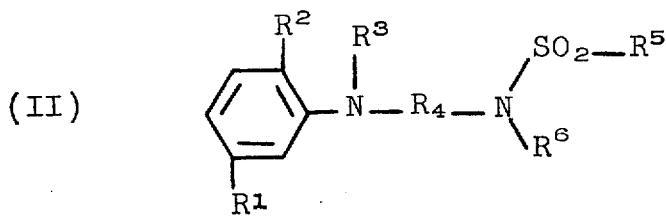

Column 5, line 18, "coresponding" should be ---corresponding-

Column 6, lines 24 through 30, the formula should read

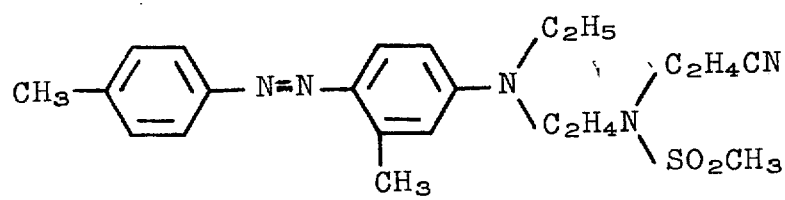

Column 6, line 44, "fifibers" should be ---fibers---.

PO-1050
(5/69)

UNITED STATES PATENT OFFICE
CERTIFICATE OF CORRECTION

Patent No. _____3,546,204_____ Dated _____December 8, 1970_____

Inventor(s) _____Max A. Weaver and David J. Wallace_____

It is certified that error appears in the above-identified patent and that said Letters Patent are hereby corrected as shown below:

Column 8, lines 6 through 11, the formula should read

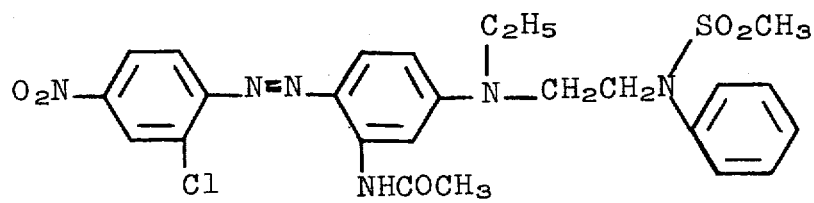

Columns 11 and 12, Example 115, under the "$(X)_n$", "4-di-$NO_2$-6-$SO_2CH_3$" should be ---2,4-di-$NO_2$-6-$SO_2CH_3$---.

Columns 9 and 10, Example 34, under the heading "$R^3$", "-$C_2H_4CH$ should be --- -$C_2H_4OH$ ---.

Columns 9 and 10, Example 20, under the heading "$R^4$", "-$C_3H_6$" should be --- -$C_3H_6$- ---.

Columns 9 and 10, Example 33, under the heading "$R^4$", "-$CH_2CH$ should be --- -$CH_2CH_2$- ---.

Columns 9 and 10, Example 62, under the heading "$R^4$", "-$CH_2CH_2$-" should be --- -$CH_2CH_2$- ---.
   |
   OH Columns 9 and 10, Example 63, under the heading "$R^4$",
"-$CH_2CHCH_2$-" should be
$$\text{--- -CH}_2\overset{\overset{\text{OH}}{|}}{\text{C}}\text{HCH}_2\text{- ---}.$$

PO-1050
(5/69)

UNITED STATES PATENT OFFICE
CERTIFICATE OF CORRECTION

Patent No. 3,546,204     Dated December 8, 1970

PAGE - 3

Inventor(s) Max A. Weaver and David J. Wallace

It is certified that error appears in the above-identified patent and that said Letters Patent are hereby corrected as shown below:

Columns 11 and 12, Example 78, under the heading "$R^4$", "$-CH_2CH_{32}-$" should be --- $-CH_2CH_2-$ ---.

Columns 11 and 12, Examples 82 and 99, under the heading "$R^4$", "$-CH_2CH_2$" should be --- $-CH_2CH_2-$ ---.

Columns 9 and 10, Example 49, under the heading "$R^5$", "$C-H_3$" should be --- $-CH_3$ ---.

Columns 11 and 12, Examples 78 and 111, under the heading "$R^5$", "$-CH$" should be --- $-CH_3$ ---.

Columns 9 and 10, Example 26, under the heading "$R^6$", "$-C_2H_4\overset{O}{\overset{\|}{C}}CNHC_6H_5$" should be --- $-C_2H_4O\overset{O}{\overset{\|}{C}}NHC_6H_5$ ---.

Columns 9 and 10, Example 31, under the heading "$R^6$", "$-C_2H_4BrCN$" should be --- $-C_2H_4CN$ ---.

Columns 9 and 10, Example 39, under the heading "$R^6$", "$C_2H_4CN$" should be --- $-C_2H_4CN$ ---.

Columns 11 and 12, Example 83, under the heading "$R^6$", "-naphthyl" should be --- α-naphthyl ---.

Signed and sealed this 10th day of August 1971.

(SEAL)
Attest:

EDWARD M. FLETCHER, JR.
Attesting Officer

WILLIAM E. SCHUYLER, JR.
Commissioner of Patents